(12) United States Patent
Que

(10) Patent No.: US 9,671,549 B2
(45) Date of Patent: Jun. 6, 2017

(54) BACKLIGHT MODULE

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 160 days.

(21) Appl. No.: 14/438,222

(22) PCT Filed: Jan. 9, 2015

(86) PCT No.: PCT/CN2015/070412
§ 371 (c)(1),
(2) Date: Apr. 23, 2015

(87) PCT Pub. No.: WO2016/078203
PCT Pub. Date: May 26, 2016

(65) Prior Publication Data
US 2016/0356947 A1     Dec. 8, 2016

(30) Foreign Application Priority Data

Nov. 21, 2014   (CN) .......................... 2014 1 0677451

(51) Int. Cl.
*F21V 8/00*     (2006.01)

(52) U.S. Cl.
CPC ......... *G02B 6/0088* (2013.01); *G02B 6/0085* (2013.01)

(58) Field of Classification Search
CPC ............................ G02B 6/0085; G02B 6/0088
See application file for complete search history.

(56) References Cited

U.S. PATENT DOCUMENTS

| 6,417,897 | B1 | 7/2002 | Hashimoto |
| 8,964,142 | B2 | 2/2015 | Zhang et al. |
| 2008/0111939 | A1 | 5/2008 | Fang et al. |
| 2014/0176869 | A1 | 6/2014 | Lee et al. |

FOREIGN PATENT DOCUMENTS

| CN | 101539682 A | 9/2009 |
| CN | 201359237 Y | 12/2009 |

*Primary Examiner* — Thomas M Sember
(74) *Attorney, Agent, or Firm* — Andrew C. Cheng

(57) ABSTRACT

A backlight module includes a back frame, a light guide plate and a cushion disposed inside the back frame. The back frame includes a base and side walls perpendicular to the base. The cushion is arranged on an area between one of the side walls of the back frame and the LGP, used for fixing the LGP inside the back frame. Air chamber is disposed inside the flexible cushion. At least one exhaust vent is disposed on a non-contact outer wall of the cushion. The air chamber communicates with the outside air via the exhaust vent, and the cushion is fixed on one of the side walls of the back frame. The backlight module is capable of stabilizing an LGP on its position when bearing instantaneous impact forces. Besides, there is enough room for the LGP to swell without being intervened by the backlight module.

8 Claims, 1 Drawing Sheet

BACKLIGHT MODULE

BACKGROUND OF THE INVENTION

1. Field of the Invention

The present invention relates to the technological field of liquid crystal displays (LCDs), and more especially, to a backlight module.

2. Description of the Prior Art

An LCD panel is one of primary display components for an LCD. A conventional LCD panel comprises an LCD screen, a front frame, and a backlight module. The main function of the backlight module is to supply the LCD with a steady surface source. The backlight module mainly comprises an optical film, a light guide plate (LGP), a reflective sheet, a rear panel, and a plastic mid-frame.

The LGP is an important optical conducting component. The stability of the position of the LGP ensures better luminous efficacy. But it requires a better design to make sure the stability of the position of the LGP and give the LGP better protection in case that the LGP bears instantaneous impact forces. A conventional LGP is fixed with clinches and cushions traditionally. As for the LGP fixed with clinches, some room needs to be reserved in case that the LGP swells. Actually, it is very hard to fix the LGP firmly with clinches. As for the LGP fixed with cushions, there are still some problems. The material of the cushions itself is flexible. When the LGP swells because of heat or absorption of moisture, the cushions are squeezed and compressed. At this time, the density of the material of the cushions increases rapidly, and more forces are needed to compress the material of the cushions. Meanwhile, reacting forces of the cushions to the LGP increase rapidly as well, which hinders the LGP to swell. In other words, there is no enough room for the LGP to swell.

SUMMARY OF THE INVENTION

An object of the present invention is to provide a backlight module capable of stabilizing an LGP on its position when bearing instantaneous impact forces. Besides, there is enough room for the LGP to swell without being intervened by the backlight module.

According to the present invention, a backlight module, comprises:

a back frame, comprising a base and a plurality of side walls perpendicular to the base;

a light guide plate (LGP), disposed inside the back frame;

a cushion, arranged on an area between one of the plurality of side walls of the back frame and the LGP, used for fixing the LGP inside the back frame, and being flexible;

an air chamber disposed inside the flexible cushion, at least one exhaust vent disposed on a non-contact outer wall of the cushion, the air chamber communicating with the outside air via the exhaust vent, and the cushion fixed on one of the plurality of side walls of the back frame;

wherein the internal diameter of the exhaust vent is far smaller than the internal diameter of the air chamber, and when the cushion bears instantaneous impact forces, the quantity of the air in the air chamber exhausting via the exhaust vent is far smaller than the quantity of the air in the air chamber.

In one aspect of the present invention, the cushion is disposed on the base of the back frame.

In another aspect of the present invention, the backlight module further comprises a paste layer, the cushion is fixed on the side of the back frame through the paste layer, and the cushion does not contact to the base.

In another aspect of the present invention, the exhaust vent is disposed on each of upper and lower areas of the cushion.

In another aspect of the present invention, one cushion is disposed on the area between the side of the LGP and the corresponding side of the back frame, and the one cushion is disposed on the middle of the side of the LGP.

In another aspect of the present invention, at least two cushions are disposed on the area between the side of the LGP and the corresponding side of the back frame, and the two cushions are disposed on two terminals of the side of the LGP, respectively.

In still another aspect of the present invention, the cushion is disposed on the area between each of the sides of the LGP and each of the corresponding side walls of the back frame.

In yet another aspect of the present invention, the cushion is fabricated from silicon rubber.

According to the present invention, a backlight module, comprises:

a back frame, comprising a base and a plurality of side walls perpendicular to the base;

a light guide plate (LGP), disposed inside the back frame;

a cushion, arranged on an area between one of the plurality of side walls of the back frame and the LGP, used for fixing the LGP inside the back frame, and being flexible;

an air chamber disposed inside the flexible cushion, at least one exhaust vent disposed on a non-contact outer wall of the cushion, the air chamber communicating with the outside air via the exhaust vent.

In one aspect of the present invention, the cushion is fixed on the one of the plurality of sides of the back frame.

In another aspect of the present invention, the cushion is disposed on the base of the back frame.

In another aspect of the present invention, the backlight module further comprises a paste layer, the cushion is fixed on the side of the back frame through the paste layer, and the cushion does not contact to the base.

In another aspect of the present invention, the exhaust vent is disposed on each of upper and lower areas of the cushion.

In another aspect of the present invention, the internal diameter of the exhaust vent is far smaller than the internal diameter of the air chamber, and when the cushion bears instantaneous impact forces, the quantity of the air in the air chamber exhausting via the exhaust vent is far smaller than the quantity of the air in the air chamber In another aspect of the present invention, one cushion is disposed on the area between the side of the LGP and the corresponding side of the back frame, and the one cushion is disposed on the middle of the side of the LGP.

In another aspect of the present invention, at least two cushions are disposed on the area between the side of the LGP and the corresponding side of the back frame, and the two cushions are disposed on two terminals of the side of the LGP, respectively.

In still another aspect of the present invention, the cushion is disposed on the area between each of the sides of the LGP and each of the corresponding side walls of the back frame.

In yet another aspect of the present invention, the cushion is fabricated from silicon rubber.

Compared with the prior art, a flexible cushion is disposed on the area between the LGP and one side of the back frame in the present invention. The LGP is fixed inside the back frame with the cushion. An air chamber is disposed inside the cushion. At least one exhaust vent is disposed on the non-contact outer wall of the cushion. The air chamber communicates with the outside air via the exhaust vent. When the backlight module bears instantaneous impact forces, the LGP imposes instantaneous impact forces on the cushion. The air inside the air chamber exhausts very little from the exhaust vent in a very short time compared with the overall air inside the air chamber. The squeezed remaining air inside the air chamber of the cushion and the material of the cushion give a short but strong support on the LGP, which ensures the stability of the LGP. The LGP keeps squeezing the cushion because of thermal expansion. The squeezing forces are continuous and long-time forces so the air inside the air chamber of the cushion will exhaust gradually. The support on the LGP will gradually weaken. The LGP will obtain more and more room to swell.

DETAILED DESCRIPTION OF THE PREFERRED EMBODIMENTS

Figure 1:
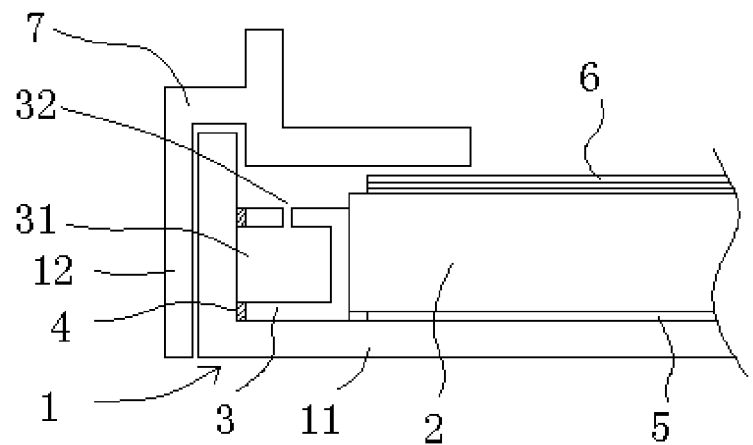
FIG. 1 shows a schematic diagram of a backlight module according to one preferred embodiment of the present invention.

Please refer to FIG. 1 showing a schematic diagram of a backlight module according to one preferred embodiment of the present invention. The backlight module comprises a back frame 1, an LGP 2, and a cushion 3. The back frame 1 serves as the support of the backlight module. The back frame 1 comprises a base 11 and a plurality of side walls 12. The base 11 is vertical to the plurality of side walls 12. The plurality of side walls 12 forms a containing frame on the base 11. Basically, the base 11 is rectangular in shape. The back frame 1 comprises four side walls 12. The four side walls 12 are arranged on the four sides of the rectangular base 11, respectively. The base 11 may be shaped differently. Specifically, it depends on the shape of the LCD panel. The LGP 2 is disposed inside the containing frame formed by the plurality of vertical side walls 12 and the base 11. The shape of the LGP 2 is the same as the shape of the base 11. The cushion 3 is arranged on the area between the four vertical side walls 12 of the back frame 1 and the LGP 2. The cushion 3 is used for fixing the LGP 2 inside the back frame 1. The cushion 3 is flexible so it can recover to its original shape quickly after external forces disappear. The cushion 3 is squeezed in the area between the plurality of vertical side walls 12 of the back frame 1 and the LGP 2. The cushion 3 contacts the plurality of vertical side walls 12 and the LGP 2, which helps the LGP 2 be firmly fixed inside the back frame 1.

An air chamber 31 is disposed inside the cushion 3. At least one exhaust vent 32 is disposed on the non-contact outer wall of the cushion 3. The air chamber 31 communicates with the outside air via the exhaust vent 32. The air chamber 31 inside the cushion 3 is not supposed to be too large. The thickness of the outer wall of the cushion 3 is not supposed to be too small in order to keep the cushion 3 in a flexible condition. The air chamber 31 can be a round, a square, or any other shape. If the air chamber 31 makes the outer wall of the cushion 3 evenly flexible, the shape of the air chamber 31 at this time is best. The cushion 3 deforms homogeneously whenever being affected by external forces rather than being distorted. The reason why the exhaust vent 32 is disposed on the non-contact outer wall of the cushion 3 is that the exhaust vent 32 needs to be able to exhaust successfully. The exhaust vent 32 has to keep away from the LGP 2 or the base 11 of the back frame 1 and the plurality of vertical side walls 12 of the back frame 1. It is possible that a plurality of exhaust vents 32 are adopted. Preferably, the plurality of exhaust vents 32 are disposed symmetrically on the upper and lower areas of the cushion 3 or on the left and right areas of the cushion 3. In this way, the cushion 3 keeps steady overall. It also helps the cushion 3 deform homogeneously.

The flexible cushion 3 is disposed on the area between the LGP 2 and the vertical side wall 12 of the back frame 1 in this embodiment. The LGP 2 is fixed inside the back frame 1 with the cushion 3. The air chamber 31 is disposed inside the cushion 3. At least one exhaust vent 32 is disposed on the non-contact outer wall of the cushion 3. The air chamber 31 communicates with the outside air via the exhaust vent 32. When the backlight module bears instantaneous impact forces, the LGP 2 imposes instantaneous impact forces on the cushion 3. The air inside the air chamber 31 exhausts very little from the exhaust vent 32 in a very short time compared with the overall air inside the air chamber 31. The squeezed remaining air inside the air chamber 31 of the cushion 3 and the material of the cushion 3 give a short but strong support on the LGP 2, which ensures the stability of the LGP 2. The LGP 2 keeps squeezing the cushion 3 because of thermal expansion. The squeezing forces are continuous and long-time forces so the air inside the air chamber 31 of the cushion 3 will exhaust gradually. The support on the LGP 2 will gradually weaken. The LGP 2 will obtain more and more room to swell. While the LGP 2 is contracting and recovering to its original shape after external forces disappear, the cushion 3 also recovers to its original shape owing to the characteristics of the material itself. Since the air outside enters the air chamber 31 via the exhaust vent 32 at the same time, the recovery of the cushion 3 is better.

Figure 2:
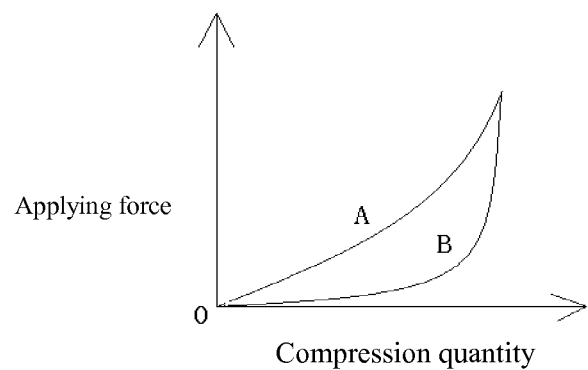
FIG. 2 is a relationship diagram showing the relationship between applying forces and compression quantity when the cushion bears instantaneous impact forces and squeezed by the swelling LGP.

Please refer to FIG. 2. FIG. 2 is a relationship diagram showing the relationship between applying forces and compression quantity when the cushion 3 bears instantaneous impact forces and squeezed by the swelling LGP 2. The vertical axis represents applying forces imposed on the cushion 3. The horizontal axis represents compression quantity taken by the cushion 3 with applying forces. The curve A represents the relationship between applying forces and compression quantity when the cushion 3 bears instantaneous impact forces. The curve B represents the relationship between applying forces and compression quantity when the cushion 3 is squeezed by the swelling LGP 2. It is found that, on the condition of the same compression quantity, much more applying forces are required with instantaneous impact forces than applying forces are required when the swelling LGP 2 squeezes the cushion 3. In other words, the cushion 3 receives a small amount of compression quantity with instantaneous impact forces. It ensures that the cushion 3 is stably in its position. Besides, the cushion 3 gets squeezed slowly while the LGP 2 swells, which supply the swelling LGP 2 with enough room.

The cushion 3 is fixed on the vertical side wall 12 of the back frame 1 with paste or nut bolts. The aim of the design is to prevent the cushion 3 from moving because of applying force produced by the deformation recovery of the cushion 3 acting with the back frame 1 when external forces imposed on the cushion 3 disappears.

The reason why the cushion 3 is arranged on the base 11 of the back frame 1 is to decrease pressure imposed on the vertical side wall 12 once the cushion 3 is arranged on the vertical side wall 12, especially when a plurality of cushions 3 are adopted.

The backlight module further comprises a paste layer 4. The cushion 3 is fixed on the vertical side wall 12 of the back frame 1 through the paste layer 4. The cushion 3 does not contact to the base 11 (not shown in the figures). One side of the paste layer 4 is pasted on the vertical side wall 12 of the back frame 1. The other side of the paste layer 4 is pasted on the cushion 3. On the premise of the paste layer 4 of adequate viscosity, the area formed by the paste layer 4 pasted on the cushion 3 should be as small as possible. As mentioned above, the cushion 3 does not contact to the base 11 (not shown in the figures). It means that the bottom of the cushion 3 is above the base 11 of the back frame 1. Once the cushion 3 get squeezed by impact forces or external forces, there is room for the cushion 3, not contacting the base 11, to deform upwards and downwards freely instead of deforming upwards only while the cushion 3 contacts the base 11. In general, an aperture is disposed on one side of the cushion 3 while the cushion 3 with the air chamber 31 is formed. Meanwhile, the paste layer 4 is disposed on the side of the cushion 3 where the aperture is disposed and seals the aperture. It ensures that the air chamber 31 is well sealed.

An exhaust vent 32 is disposed on each of the upper and lower areas of the cushion 3. When the cushion 3 does not contact to the base 11, both of the upper and lower areas of the cushion 3 are non-contact areas. When the cushion 3 bears impact forces or continuous pressure, the cushion 3 will deform upwards and downwards. The exhaust vent 32 disposed on each of the upper and lower areas of the cushion 3 ensures that consistence of upward and downward deformation of the cushion 3. The disadvantage of the exhaust vent 32 disposed on the upper or lower area of the cushion 3 is inconsistence of upward and downward deformation of the cushion 3. It is impossible to impose forces on the paste layer 4 evenly under condition of the inconsistence of upward and downward deformation of the cushion 3. The service life of the paste layer 4 is affected as well. However, the exhaust vent 32 disposed on each of the upper and lower areas of the cushion 3 ensures that the service life of the paste layer 4 is extended. Further, the exhaust vent 32 disposed on the upper area of the cushion 3 and the exhaust vent 32 disposed on the lower area of the cushion 3 are symmetrical.

The internal diameter of the exhaust vent 32 is far smaller than the air chamber 31. When the cushion 3 bears instantaneous impact forces, the quantity of the air in the air chamber 31 exhausting via the exhaust vent 32 is far smaller than the quantity of the air in the air chamber 31. The instantaneous impact forces indicate the impact forces produced by the LGP 2 to the cushion 3 when the backlight module is shaked because of being striked or carried. The air inside the air chamber exhausts very little from the exhaust vent in a very short time compared with the overall air inside the air chamber. The squeezed remaining air inside the air chamber of the cushion and the material of the cushion give a short but strong support on the LGP 2, which ensures the stability of the LGP 2. The LGP 2 keeps squeezing the cushion because of thermal expansion. The squeezing forces are continuous and long-time forces so the air inside the air chamber of the cushion will exhaust gradually. The support on the LGP 2 will gradually weaken. The LGP will obtain more and more room to swell.

Figure 3:
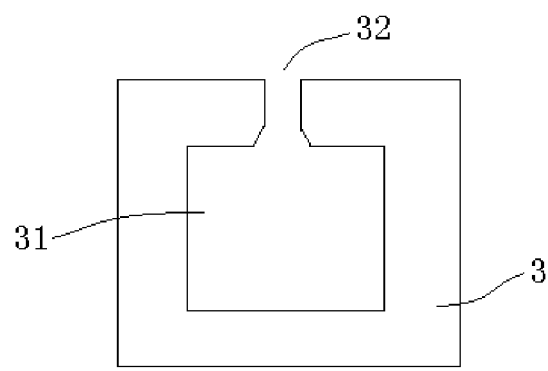
FIG. 3 is a schematic diagram of a cushion used in the backlight module according to another embodiment of the present invention.

Please refer to FIG. 3. In the present invention, the exhaust vent 32 disposed on one side of the air chamber 31 is funnel-shaped. The internal diameter of the exhaust vent 32 near the air chamber 31 is a bit larger for preventing the cushion 3 from sealing the exhaust vent 32 when the cushion 3 is squeezed and deformed.

A cushion 3 is disposed on the area of one side of the LGP 2 and the vertical side wall 12 of the back frame 1 opposite to the side of the LGP 2. The cushion 3 is disposed on the middle of the side of the LGP 2. The reason why the cushion 3 is disposed on the middle of the side of the LGP 2 is to prevent the LGP 2 from rotating because of forces imposed on the terminal of the LGP 2 after the LGP 2 swells or get impacted.

At least two cushions 3 are disposed on the area between the side of the LGP 2 and its corresponding vertical side wall 12 of the back frame 1 where two cushions 3 are disposed on each of the two terminals of the side of the LGP 2, and the other cushions 3 are disposed on the middle of the two cushions 3 at each of the terminals. In this way, the cushions 3 will not rotate when the LGP 2 swells or impact forces are imposed on the LGP 2. If all of the cushions 3 are disposed on one side of the LGP 2, the cushions 3 will rotate.

A cushion 3 is disposed on the area between each side of the LGP 2 and each corresponding vertical side wall 12 of the back frame 1. It is possible that one or more than one cushion 3 is disposed on the area between each side of the LGP 2 and each corresponding vertical side wall 12. It is also possible that different numbers of cushions 3 are disposed on the area between each side of the LGP 2 and each corresponding vertical side wall 12 at the same time. It is recommended that the cushions 3 disposed on the area between one side of the LGP 2 and its corresponding vertical side wall 12 are as many as those disposed on the area between the opposite side of the LGP 2 and its corresponding vertical side wall 12.

The cushion 3 is fabricated from silicon rubber since silicon rubber is flexible enough to get recovered quickly when silicon rubber is not squeezed by external forces. Silicon rubber has characteristics of excellent heat resistance, chilling tolerance, dielectricity, ozone resistance, and atmospheric aging resistance. Besides, silicon rubber has an outstanding feature. Silicon rubber serves wide temperature. Silicon rubber can serve long time from −60 degrees centigrade (° C.) (or lower degrees) to +250° C. (or higher degrees).

The backlight module provided by the embodiment of the present invention further comprises a reflective sheet 5, an optical film unit 6, and a plastic mid-frame 7. The reflective sheet 5 is disposed on an area between the LGP 2 and the base 11 of the back frame 1. The optical film unit 6 is disposed on the LGP 2. The plastic mid-frame 7 is buckled up on the side wall 12 of the back frame 1. One terminal of the plastic mid-frame 7 extends to the optical film unit 6. The optical film unit 6 is fixed on the LGP 2. A light emitted by the light source passes through the LGP 2 and the optical film unit 6 and enters the LCD screen. The reflective sheet 5 receives a light from the LGP 2 and reflexes the light to the optical film unit 6.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A backlight module, comprising:
a back frame, comprising a base and a plurality of side walls perpendicular to the base;
a light guide plate (LGP), disposed inside the back frame;
a cushion, arranged on an area between one of the plurality of side walls of the back frame and the LGP, used for fixing the LGP inside the back frame, and being flexible;
an air chamber disposed inside the flexible cushion, at least one exhaust vent disposed on a non-contact outer wall of the cushion, the air chamber communicating with the outside air via the exhaust vent, and the cushion fixed on one of the plurality of side walls of the back frame;
wherein an internal diameter of the exhaust vent is far smaller than an internal diameter of the air chamber, and when the cushion bears instantaneous impact forces, a quantity of the air in the air chamber exhausting via the exhaust vent is far smaller than a quantity of the air in the air chamber.

2. The backlight module as claimed in claim 1, wherein the cushion is disposed on the base of the back frame.

3. The backlight module as claimed in claim 1 further comprising a paste layer, wherein the cushion is fixed on the side wall of the back frame through the paste layer, and the cushion does not contact the base of the back frame.

4. The backlight module as claimed in claim 1, wherein the cushion is fabricated from silicon rubber.

5. A backlight module, comprising:
a back frame, comprising a base and a plurality of side walls perpendicular to the base;
a light guide plate (LGP), disposed inside the back frame;
a cushion, arranged on an area between one of the plurality of side walls of the back frame and the LGP, used for fixing the LGP inside the back frame, and being flexible;
an air chamber disposed inside the flexible cushion, at least one exhaust vent disposed on a non-contact outer wall of the cushion, the air chamber communicating with the outside air via the exhaust vent,
wherein the cushion is fixed on one of the plurality of side walls of the back frame,
wherein the backlight module further comprises a paste layer, the cushion is fixed on the side of the back frame through the paste layer, and the cushion does not contact the base of the back frame.

6. The backlight module as claimed in claim 5, wherein the cushion is disposed on the base of the back frame.

7. The backlight module as claimed in claim 5, wherein an internal diameter of the exhaust vent is far smaller than an internal diameter of the air chamber, and when the cushion bears instantaneous impact forces, a quantity of the air in the air chamber exhausting via the exhaust vent is far smaller than a quantity of the air in the air chamber.

8. The backlight module as claimed in claim 5, wherein the cushion is fabricated from silicon rubber.

* * * * *